No. 668,349. Patented Feb. 19, 1901.
W. ESCHEMANN.
LETTER SCALE.
(Application filed Mar. 13, 1899.)
(No Model.) 2 Sheets—Sheet 2.
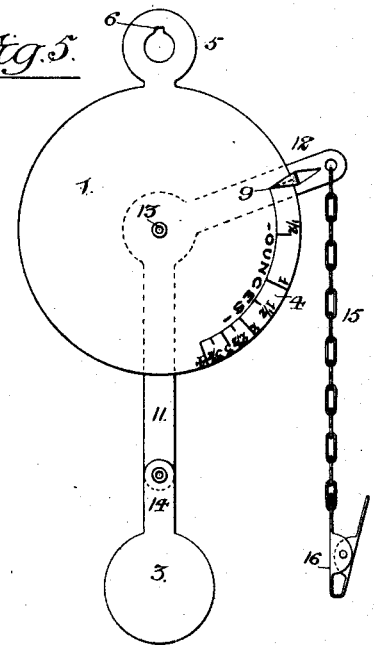
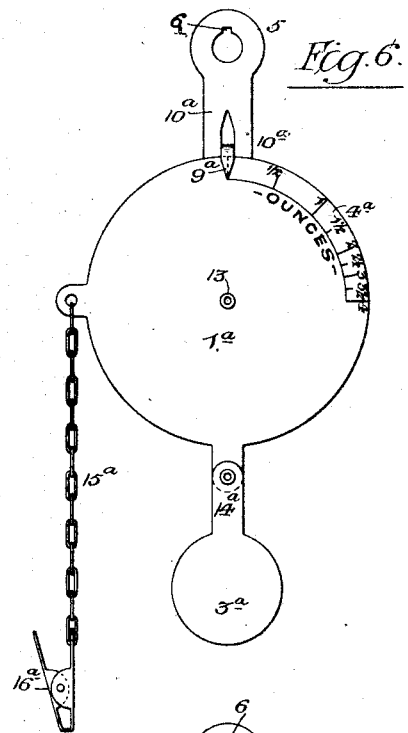
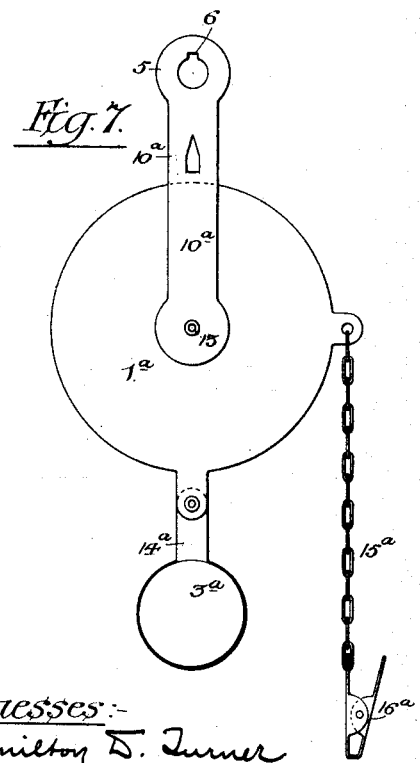
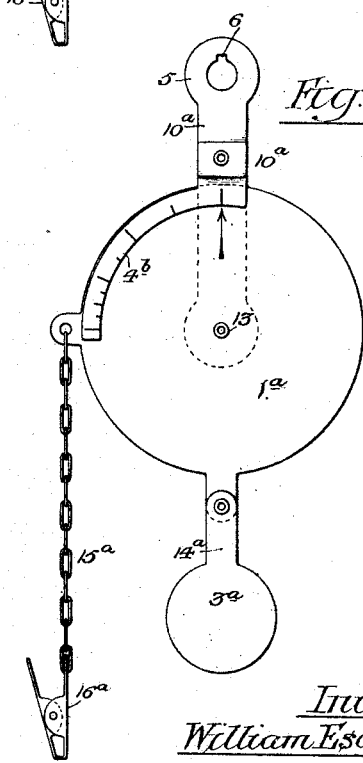
Witnesses:—
Hamilton D. Turner
Louis M. V. Whitehead
Inventor:
William Eschemann
by his Attorneys:—
Howson & Howson

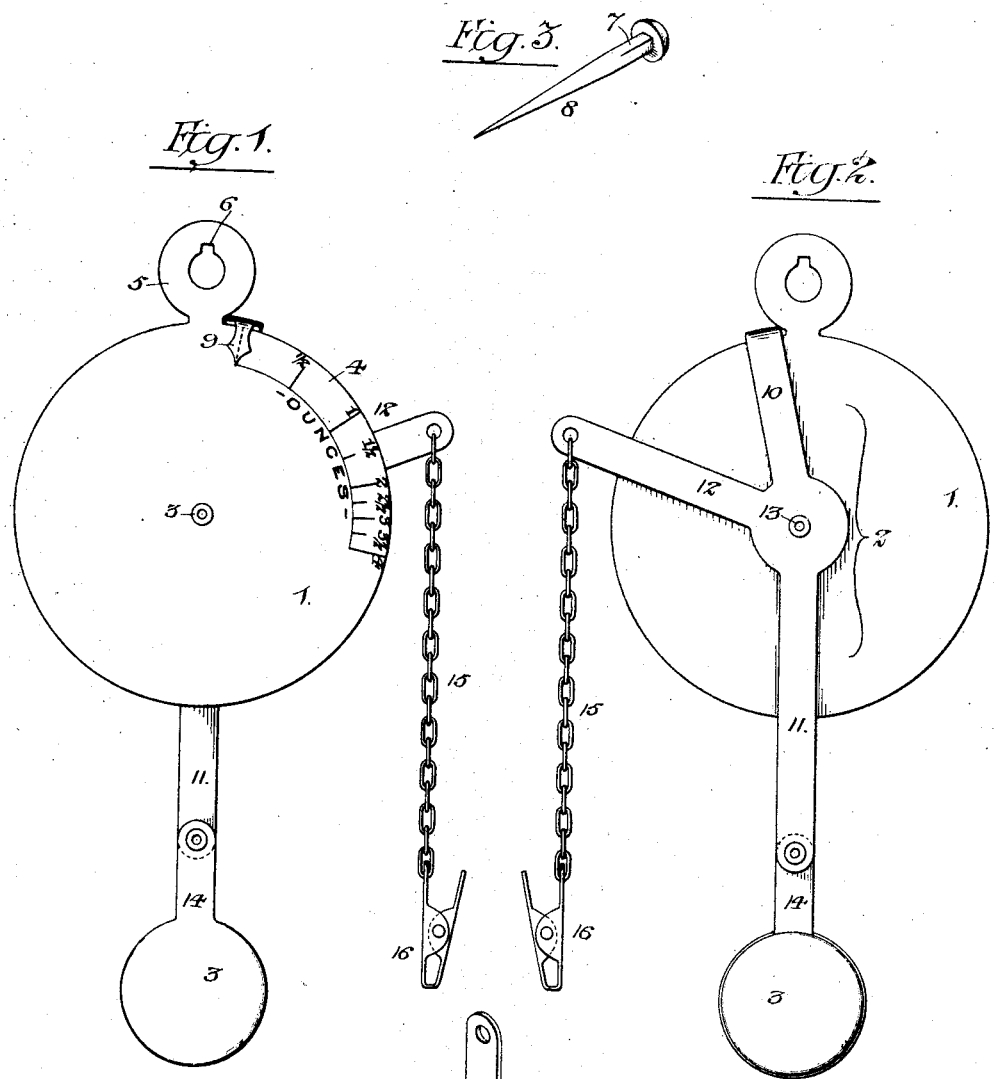

UNITED STATES PATENT OFFICE.

WILLIAM ESCHEMANN, OF PHILADELPHIA, PENNSYLVANIA, ASSIGNOR OF ONE-THIRD TO GEORGE W. KOCH, OF SAME PLACE.

LETTER-SCALE.

SPECIFICATION forming part of Letters Patent No. 668,349, dated February 19, 1901.

Application filed March 13, 1899. Serial No. 708,869. (No model.)

*To all whom it may concern:*

Be it known that I, WILLIAM ESCHEMANN, a citizen of the United States, residing in Philadelphia, Pennsylvania, have invented certain Improvements in Letter-Scales, of which the following is a specification.

The object of my invention is to provide a letter-scale which is operative without the use of springs and is of such a simple character that it can be made cheaply enough to be available for use as an advertising medium for gratuitous distribution. This object I attain in the manner hereinafter set forth, reference being had to the accompanying drawings, in which—

Figure 1 is a front view of a letter-scale constructed in accordance with my invention. Fig. 2 is a rear view of the same. Fig. 3 is an enlarged perspective view of the hook or pin from which the scale is suspended. Fig. 4 is a perspective view illustrating a modification of one of the parts of the scale; and Figs. 5, 6, 7, and 8 are views illustrating other forms of scale embodying the main features of my invention, Fig. 7 being a rear view of Fig. 6.

The scale shown in Figs. 1 and 2 comprises three main parts—namely, the face-plate 1, the three-armed lever 2, and the weight 3, all of which can be made from sheet metal by inexpensive operations, so that the cost of the device can be reduced to a minimum. The face-plate has at the top an eye 5, whereby the scale may be suspended, and in order to prevent the swinging of the scale on the suspending pin or hook the eye 5 has at the top a rectangular notch 6, which is intended for the reception of a rectangular portion 7 upon the suspending pin or hook, Fig. 3, whereby the scale is rigidly held in vertical position.

Extending part way around the face-plate 1, adjacent to the periphery of the same, is a graduated scale 4, divided into ounces and half-ounces, and in connection with this scale operates a pointer 9, consisting of the forwardly and downwardly bent end of an arm 10 of the three-armed lever 2, which is disposed behind the face-plate and is hung so as to be free to swing upon a pin, lug, eyelet, or other suitable central support 13 on said face-plate.

The depending arm 11 of the lever 2 has at its lower end an arm 14, carrying the weight 3, said arm 14 being pivoted to the lower end of the arm 11, so that it always preserves its vertical position irrespective of the angle assumed by said arm 11. If desired, the weight may be secured directly to the lower end of said arm 11, the swinging connection being preferred, however, as the more efficient of the two, because as the arm 11 swings upward it does not carry the weight so far from the axis, and hence does not increase the power of the weight to the same extent as if the latter were attached directly to the arm 11. To the third arm 12 of the lever 2 is connected the upper end of a chain 15, which has at its lower end a spring-clip 16 of any ordinary construction for grasping and retaining the letter, package, or other object to be weighed.

In some cases I may use in place of the chain and clip an arm 17, with clasp 18 at the lower end, as shown in Fig. 4, one end of the clasp being bent upward, so as to form a hook 19, which serves as a means of suspending letters or packages of such size or shape that they cannot be held by the clasp.

The arms 11 and 12 of the lever 2 are so disposed angularly in respect to each other that when the arm 11 occupies its normal vertical position the arm 12 will be at the limit of its upward movement, and any weight exerted upon the outer end of said arm 12, tending to pull down the same, will cause lateral deflection of the arm 11, the power of the weight gradually increasing as said arm 11 departs more and more from the normal vertical position.

The device described can be so cheaply made that while it constitutes a sufficiently accurate scale for ordinary use its cost is well within the limit of articles intended for free distribution for advertising purposes, the utility of the device rendering it exceptionally available for such use.

A simpler form of my improved scale is that shown in Figs. 6 and 7. In this case the eye 5 is formed upon a pointer-arm $10^a$ and the face-plate $1^a$ is centrally pivoted upon said arm and has hung from it the weight $3^a$, the clip $16^a$ being suspended from the face-plate by means of a wire, chain, or other connection 15ª. The face-plate 1ª thus becomes the swinging element and carries the letter-receiver and the weight. The graduated scale may, if desired, be carried by the arm 10ª, so as to operate in connection with a pointer on the face-plate—as shown, for instance, at 4ᵇ in Fig. 8.

Having thus described my invention, I claim and desire to secure by Letters Patent—

A letter-scale consisting of a face-plate and an arm, said parts being pivoted directly together, one of said parts having a graduated scale and the other a pointer, and one of them carrying a depending weighted and independently-swinging arm, and a depending and independently-swinging letter-clip, the arm being disposed behind the face-plate and having a bent and projecting portion overlapping said face-plate, and one of the pivoted parts having an eye whereby it may be suspended and thus support the other part, substantially as specified.

In testimony whereof I have signed my name to this specification in the presence of two subscribing witnesses.

WILLIAM ESCHEMANN.

Witnesses:
   Jos. H. Klein,
   Frank E. Bechtold.